United States Patent [19]
Mino

[11] Patent Number: 4,767,493
[45] Date of Patent: Aug. 30, 1988

[54] METHOD FOR HEAT-TREATING METAL

[75] Inventor: Kazuaki Mino, Chiba, Japan

[73] Assignee: Director General of Agency of Industrial Science and Technology, Tokyo, Japan

[21] Appl. No.: 923,606

[22] Filed: Oct. 27, 1986

[30] Foreign Application Priority Data

Oct. 30, 1985 [JP] Japan ................... 60-241570

[51] Int. Cl.$^4$ .................... C30B 1/06; B22D 23/04
[52] U.S. Cl. .................... 156/603; 164/122; 164/122.1; 164/122.2; 156/DIG. 73; 419/29
[58] Field of Search ............... 156/603; 164/DIG. 73, 164/122, 122.1, 122.2; 419/29

[56] References Cited

U.S. PATENT DOCUMENTS

| 1,536,905 | 5/1925 | Meloche | 164/122.1 |
| 2,943,007 | 6/1960 | Walker et al. | 156/603 |
| 2,946,680 | 7/1960 | Raymont | 419/29 |
| 3,382,047 | 5/1968 | Holteberg et al. | 156/603 |
| 3,841,384 | 10/1974 | Tingquist et al. | 164/122.1 |
| 3,960,647 | 6/1976 | Faure et al. | 156/603 |
| 4,236,925 | 12/1980 | Onuki et al. | 419/29 |

FOREIGN PATENT DOCUMENTS

| 2489846 | 3/1982 | France | 164/122.1 |
| 58-104100 | 6/1983 | Japan | 156/603 |

Primary Examiner—John Doll
Assistant Examiner—Robert M. Kunemund
Attorney, Agent, or Firm—Scrivener and Clarke

[57] ABSTRACT

In order to obtain a desired metal structure in a metal or alloy part having discontinuous portions, the metal or alloy part to be treated is inserted into a mold having a simple outer surface configuration. Thereafter the metal or alloy part to be treated is heated together with the mold.

3 Claims, 1 Drawing Sheet

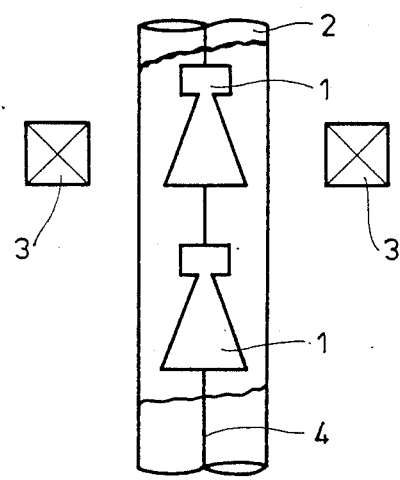
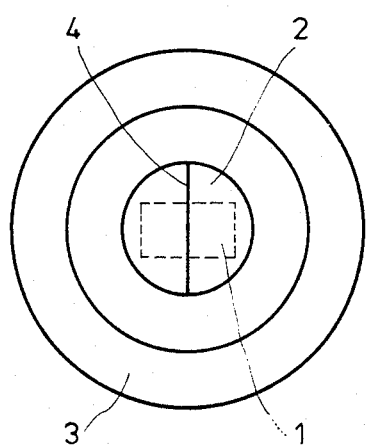
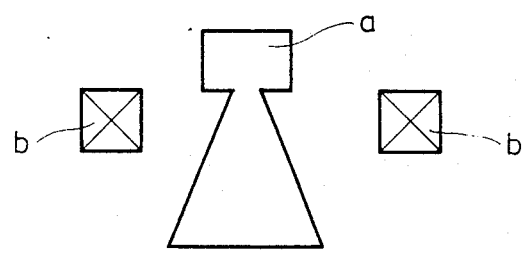

METHOD FOR HEAT-TREATING METAL

BACKGROUND OF THE INVENTION

The present invention relates to a method for heat-treating a metal structure applied for making metal crystals considerably coarse, growing a single crystal or making crystals coarse in one direction (unidirectional crystal grain growth) by way of secondary recrystallization as in the case of production of single crystal metals by a strain annealing process or in the case of production of unidirectionally recrystallized metals by a powder metallurgy process.

With a conventional heat treatment for making metal crystals of an alloy considerably coarse, as shown in FIG. 3, a metal or alloy a to be treated is made to gradually pass through a zone-heating portion b defined by heating coils or the like while being exposed to the surrounding atmosphere. A pyrometer is used to sense the temperature of the metal or alloy a or the temperature of the atmosphere in a heating furnace, thereby controlling the electric power of the furnace.

When the metal or alloy a to be treated in the conventional system has large discontinuous portions such as large steps as shown in FIG. 3, heat release from the metal or alloy a varies with time. Even when the temperature of zone-heating portion b is maintained at a predetermined level, the maximum heating temperatures may therefore vary from one point to another on the metal or alloy a, whereby the metal or alloy a may be melted or maintained at temperatures lower than a recrystallization temperature, resulting in failure to obtain metal or alloy products having desired qualities.

In view of the above, the present invention provides a metal heat treatment method capable of effecting a desired and suitable heat treatment of metal or alloy parts having complicated configurations. According to the present invention, a metal or alloy part to be treated is inserted into a mold whose inner surface is formed to receive the part in close spacing therewith whose outer surface is simple and whose cross section perpendicular to the direction of relative movement between the mold and heating means is substantially constant. The metal or alloy part a as well as the mold are simultaneously heated so that the metal or alloy part is heated through the mold so that the maximum heating temperature can be maintained constant at all the surfaces of the metal or alloy part.

BRIEF DESCRIPTION OF THE DRAWINGS

FIG. 1 is a longitudinal sectional view of a preferred embodiment of the present invention;

FIG. 2 is a top view thereof; and

FIG. 3 is a longitudinal sectional view illustrating a conventional system.

DETAILED DESCRIPTION OF THE PREFERRED EMBODIMENT

One preferred embodiment of the present invention will be described in detail with reference to the accompanying drawings.

In FIGS. 1 and 2, reference numeral 1 designates a metal or alloy part to be treated; and 2, a mold into which is inserted the metal or alloy part 1 to be treated.

As seen in FIG. 1, the inner surface 2a of the mold 2 is designed and constructed to conform to the outline or profile of the the metal or alloy part 1 to be treated so that when it is inserted into the mold 2, there exists not too large a spacing between the part 1 to be treated and the inner surface 2a of the mold 2 and that the outer form 2b of the mold 2 is simple and continuous in the axial direction like a bar having a circular or square cross sectional configuration. The metal or alloy part 1 to be treated is inserted into the inner surface 2a of the mold 2. The metal or alloy part 1 and the mold 2 are then simultaneously heated in a heating zone 3 defined by a high frequency induction heating coil, a carbon susceptor or the like.

Spacing between the metal or alloy part 1 and the inner surface 2a of the mold 2 and difference in thermal characteristics therebetween affect the easiness with which the temperature control is made. That is, the smaller the spacing and the difference in thermal characteristics, the easier the temperature control becomes. Furthermore, the surface temperature of the mold 2 becomes higher than a heat-treatment temperature so that it is preferable that the mold 2 is made of a material having a higher melting point. It is also preferable that the inner surface 2a of the mold 2 is fabricated by precision casting or electro-discharge machining and that the mold is in the form of a split type for ease of insertion or removal of the metal or alloy part 1 into or out of the inner surface 2a of the mold 2. In FIGS. 1 and 2, reference numeral 4 designates a split surface of the mold 2.

It is preferable to employ a direct high frequency induction heating process rather than a radiation heating process because the former process has not only merit in that heating speed is high but also in that a large temperature gradient, which is preferable in zone heating, can be obtained. Generally, the mold 2 in the form of a round bar can more easily attain a uniform temperature distribution than the that in the form of a square bar. However, the latter may be suitable where the metal or alloy part 1 to be treated is thin like an airfoil of a turbine blade.

The alloy part 20 mm in width and 70 mm in length and corresponding to part 1 but having two steps about 4 mm and 6 mm, respectively, in thickness was obtained by precision forging by a vacuum hot press from a hot extruded round bar 13 mm in diameter of an oxide-dispersion-reinforced alloy consisting of 22% of Cr, 18% of Co, 4% of W, 1.5% of Ta, 2% of Ti, 2.5% of Al, 1% of $Y_2O_3$ and the remaining portion of Ni. The alloy part was then subjected to the uniaxial grain growth process to which was applied the present invention. In this case, the mold 2 was of a two-split type, was made of an alloy whose components are substantially similar to those of the above-described alloy except $Y_2O_3$, had a cross sectional area of $20 \times 30$ mm$^2$ and a length of 150 mm and whose interior surface 2a was machined to permit the insertion of a part to be treated therein.

Thereafter a mold release agent was applied to the outer surface of the alloy part and the latter was then inserted into the mold. The mold was heated to 1,300° C. by the high frequency induction coil of 50 kw and was moved at the speed of 100 mm per hour to effect zone heating. As a result, the alloy part had a desired unidirectional crystal grain growth structure.

In carrying out the zone heating, the mold may be sealed and/or the oxygen may be extracted from the mold for attainment of the zone heating in the air atmosphere.

The effects, features and advantages of the present invention may be summarized as follows:

(i) The outer surface configuration of the mold is continuous and simple so that it becomes possible to carry out the zone heat treatment of a metal or alloy part having complicated configurations and received in the interior surface of the mold machined or otherwise shaped to receive the part with small spacing between the part and the inner surface.

(ii) When the mold into which are inserted a plurality of metal or alloy parts to be treated is used, the metal or alloy parts can be continuously zone-heated.

(iii) When the parting surface of the split mold is sealed or the mold is inserted into a cylinder and the cylinder is made to have a non-oxidizing atmosphere, it becomes possible to carry out the zone heating in the atmosphere so that a high degree of productivity can be ensured.

What is claimed is:

1. A method for heat-treating a metal or alloy part comprising inserting said part into a mold having an inner surface formed to receive the part in close spacing therewith, said mold having an outer surface which is substantially continuous in an axial direction, heating said mold and, simultaneously, said part through said mold until all of said part is at its heat treatment temperature, and controlling the heat treatment temperature of said part as a function of the spacing of said part and the inner surface of the mold and also as a function of the difference in thermal characteristics of said part and said mold.

2. A method according to claim 1 wherein said mold has parting surfaces which are sealed for attainment of zone heating in air temperature.

3. The method according to claim 1, wherein said spacing and said difference in thermal characteristics are selected on the basis that the smaller the spacing and the smaller the difference in thermal characteristics the easier to control the heat treatment temperature of said part.

* * * * *